G. DE LAVAL.
DRILL.
APPLICATION FILED AUG. 16, 1916.
1,240,158.
Patented Sept. 11, 1917.
2 SHEETS—SHEET 1.
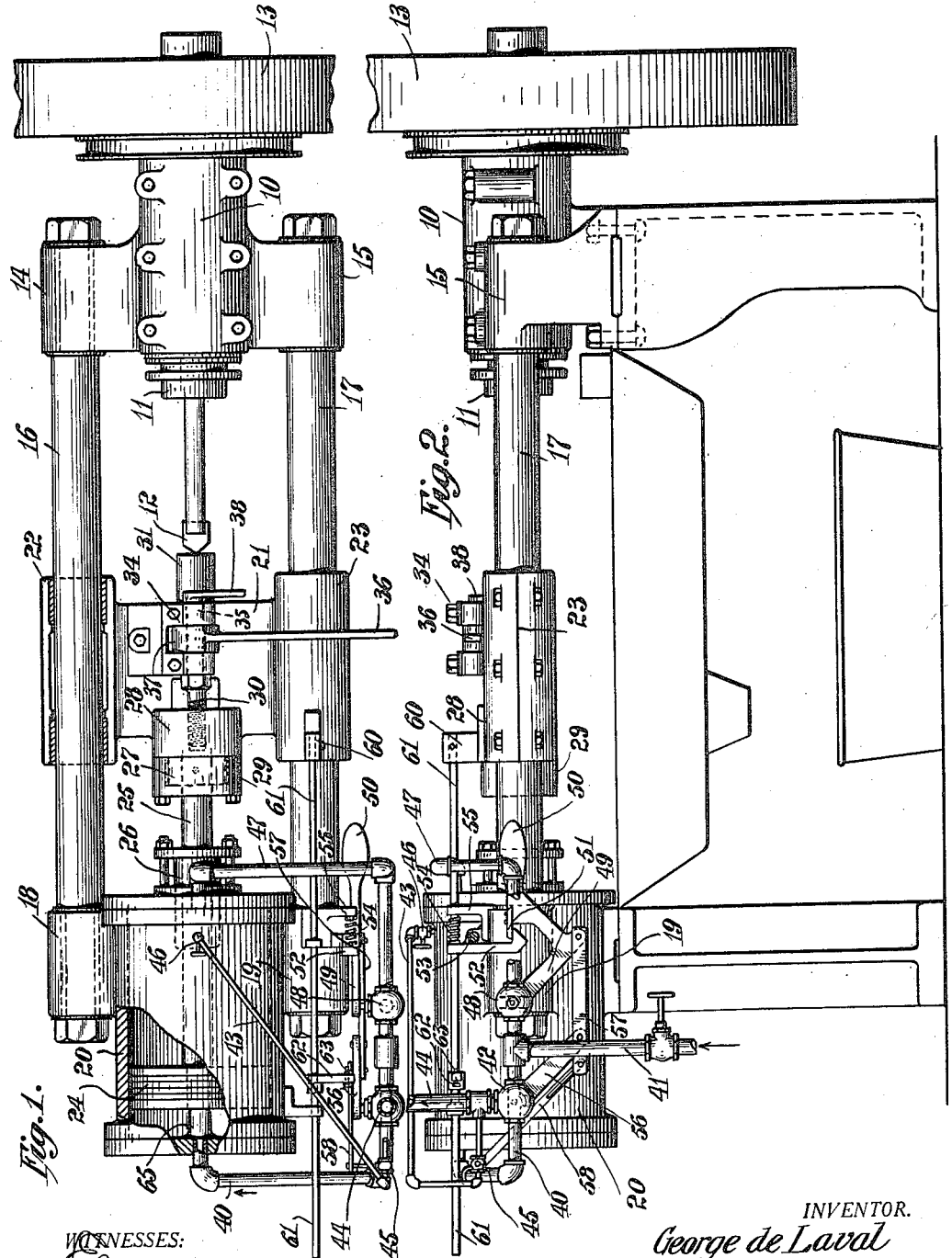
INVENTOR.
George de Laval
BY
George F. Scull
His ATTORNEY
WITNESSES:

G. DE LAVAL.
DRILL.
APPLICATION FILED AUG. 16, 1916.
1,240,158.
Patented Sept. 11, 1917.
2 SHEETS—SHEET 2.
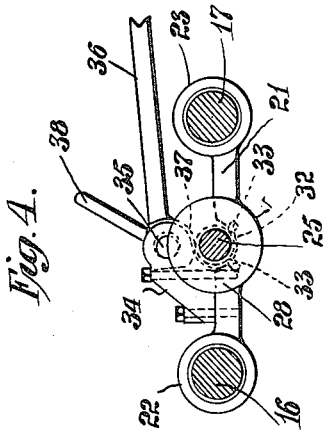
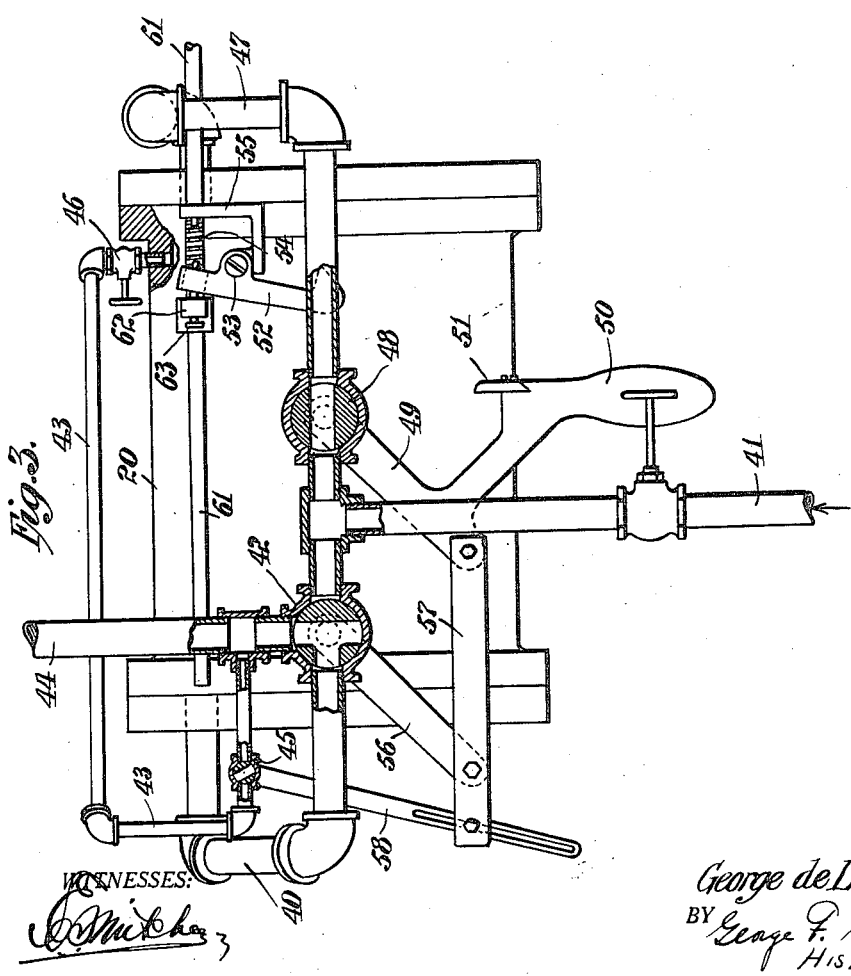
INVENTOR.
George de Laval
BY George F. Scull
HIS ATTORNEY

UNITED STATES PATENT OFFICE.

GEORGE DE LAVAL, OF ORANGE, NEW JERSEY, ASSIGNOR TO T. A. GILLESPIE COMPANY, OF NEW YORK, N. Y., A CORPORATION OF DELAWARE.

DRILL.

1,240,158.                    Specification of Letters Patent.      Patented Sept. 11, 1917.

Application filed August 16, 1916. Serial No. 115,137.

*To all whom it may concern:*

Be it known that I, GEORGE DE LAVAL, a citizen of the United States, and a resident of Orange, county of Essex, State of New Jersey, have invented certain new and useful Improvements in Drills, of which the following is a specification.

This invention relates to machines for working metals or other materials, and particularly one for drilling, facing or the like, and more particularly to such a machine in which the motion toward each other of the operating tool and the material operated on, is obtained by fluid pressure.

One of the objects of the invention is to provide a machine which is inexpensive to build and maintain, and at the same time, capable of giving a high rate of production. Another object of the invention is to provide a fluid controlled feed device in which the rate of feed may be readily regulated, and one which at the same time, will be sufficiently elastic to respond to slight variations in the resistance offered by the working operation. Another object of the invention is to provide a fluid operated feed which will return the parts automatically to their initial positions when the work operation is completed.

With these and other objects in view, my invention consists of certain novel features of construction, combination and arrangement of parts, as will be more fully described and pointed out in the appended claims.

In the drawings, Figure 1 is a plan view of a drilling machine, which I have adopted for purposes of illustration of my invention;

Fig. 2 is a side elevation of Fig. 1;

Fig. 3 is an enlarged detail of the piping arrangement and of the automatic reversing devices of the form of my invention which I have chosen for purposes of illustration; and Fig. 4 is an end elevation of the work carriage shown in Figs. 1 and 2.

The corresponding parts are referred to both in the drawings and in the specification by similar reference characters.

In the drawings 10 is a tool spindle bearing, carrying a tool spindle 11 having the drill 12. To one end of the spindle 11 is attached a pulley 13 driven by any suitable means to rotate the drill 12.

A pair of lugs 14, 15 is cast integral with the spindle bearing 10 and in these lugs are held rigidly a pair of rods 16, 17.

The other ends of the rods 16, 17 are held in lugs 18, 19 cast integral with a hydraulic cylinder 20. The rods 16, 17 are held in the lugs 14, 15, 18 and 19 so that any motion between the cylinder 20 and the spindle bearing 10 is prevented.

The rods 16 and 17 serve as ways for a work support 21 having bearings 22 and 23 slidably mounted on the rods 16 and 17.

In the cylinder 20 is a piston 24 provided with a piston rod 25 working through a suitable gland 26. To the outer end of the piston rod 25 is fastened a collar 27. The flat end of the rod 25 abuts against a smooth surface on a projection 28 forming part of the work carriage 21 and a cap 29 is attached to the projection 28 over the collar 27 so that as the rod 25 is moved backward, or to the left of Fig. 1, it will draw the work carriage 21 with it.

The projection 28 is provided with an adjusting screw 30 made with a smooth end so as to contact directly with the work to be forced against the drill 12. In the drawings this work is illustrated by the cylindrical piece 31. In order to support this work, the work support 21 is hollowed out as at 32 and is provided with a pair of steel bars 33 on which the cylindrical piece 31 is laid. In a suitable bracket 34 connected to the work carriage 21 is mounted a short shaft 35 having its central portion between the two bearings of the bracket 34, slightly eccentric. On this eccentric portion of the shaft 35 is mounted a work-holding lever 36 having an eccentric nose piece 37 formed integral therewith. A lever 38 is fastened to the shaft 35 so that the latter may be rotated in the bracket 34. This permits the eccentric portion of the shaft 35, on which is mounted the work clamping lever 36, to be slightly rotated to bring the center of the lever 36 toward or away from the center of the work 31. It will be seen that when the clamping lever 36 is moved downward, the eccentric nose 37 engages the work 31 and clamps it rigidly against the members 33—33, thereby preventing its rotation.

As will be seen from the construction of the machine as so far described, as the piston 24 is moved to the right of Fig. 1, the piston rod 25 will press against the projection 28 and move the work carriage 21 and the adjusting screw 30 will press against the cylindrical piece 31 to feed the latter against the drill 12, this cylindrical piece 31 being prevented from rotation during such time by pressure of the clamp lever 36.

Preferably, for this feeding motion of the work, I provide a hydraulic pressure supplied behind the piston 24. This pressure is applied through the inlet pipe 40 from a supply pipe 41, through a three-way valve 42, which is shown in Figs. 1 and 2 in a position to permit this flow. 43 is a smaller outlet pipe connected to the front end of the cylinder 20, and leading to a waste pipe 44 through a valve 45. A valve 46, preferably manually controlled, is provided in the pipe 43 to control the rate of flow of the fluid therethrough. Connected to the front end of the cylinder 20, is a reversing pipe 47 which connects with the supply pipe 41 through a two-way valve 48.

Preferably, the valves 42, 45 and 48 are each provided with operating means connected together so that they can be moved simultaneously. This operating means for the valve 48 is a lever 49 having its end 50 formed as a handle and a weight. The lever 49 is also provided with a catch piece 51 which is arranged to engage a catch 52 pivoted at 53 and held normally in the position shown in Fig. 2 by a spring 54 abutting against the upper end of the catch 52 and against a projection 55 on the bracket supporting the center 53. When the lever 49 is in the position shown in Fig. 2, the valve 48 is closed so that no fluid can pass through the pipe 47.

The valve 42 is provided with a lever 56 connected by a link 57 with the lever 49. In the position in which this valve is shown in Fig. 2, the pipe 40 is open to the supply pipe 41 and closed to the waste pipe 44.

Connected to the levers 49 and 56, in any suitable manner, as by the pin and slot connection shown in Figs. 1 and 3, is a lever 58 controlling the valve 45. In the position shown in Fig. 2, this valve is positioned so as to open the pipe 43 to the waste pipe 44.

Attached to the work support 21 is a bracket 60 in which is fastened a rod 61 carrying an adjustable member 62 provided with an adjusting screw 63.

With the parts in the position shown in Figs. 1 and 2, fluid supply from the pipe 41 will pass through the valve 42 and pipe 40 behind the piston 24, to move the work support and the cylindrical piece 31 carried thereby against the drill 12. The cylinder 20 on the other side of the piston 24 is filled with fluid and the rate at which the piston 24 can move forward is determined by the rate of flow permitted through the pipe 43 by the regulation of the valve 46. The rate of flow past this valve 46 is also controlled by the difference between the total pressure on the rear of the piston 24 and the counter pressure of the drill 12. It will be seen that, with a given setting of the valve 46, the work support will be fed forward at a speed which will be slightly varied according to variations in the counter pressure set up by the drill 12. For instance, if the resistance to the drill 12 should increase, due, for example, to a hard spot in the cylindrical piece 31, then the available pressure to force the fluid through the pipe 43 will be reduced thereby reducing the rate of flow and correspondingly the rate of forward feed of the piston 24. On the other hand, if the resistance to the drill 12 decreases, this will increase the pressure on the fluid passing through the valve 46, and will thereby increase slightly the rate of feed.

As the work support moves to the right of Figs. 1 and 2, it carries with it the rod 61 and the member 62 until the set screw 63 contacts with the upper end of the catch 52. This rotates the catch 52 and withdraws its lower hooked end from beneath the catch piece 51 on the lever 49. When this occurs, the weight 50 swings the lever 49 into position shown in Fig. 3, and, by reason of the connection between the various valves, sets them in the positions shown in Fig. 3. Thereupon, the piston 24 is returned to the position shown in Fig. 1, the fluid at the rear of the piston passing through the pipe 40 and the valve 42 into the waste pipe 44. At the same time the inlet pipe 41 is opened through the valve 48 to the pipe 47 to force the fluid into the front end of the cylinder and to move the piston to the left of Fig. 1. To prevent unnecessary waste of the fluid passing to the front end of the cylinder, I preferably arrange the valve 45 so that it is closed during this return of the piston; thereby preventing water entering the front of the cylinder 20 and passing immediately through the pipe 43 into the waste pipe 44.

When the piston reaches its extreme of travel to the left of Fig. 1, it abuts against a projection 65 on the cylinder head of cylinder 20.

It will be understood that the pipe 41 is connected to any suitable source of supply by which a substantially constant pressure is given to the fluid in the pipe. This may be any of the numerous forms of hydraulic towers or the like, and since it forms no part of my present invention, further description thereof is unnecessary.

It will be understood that the parts of the machine which I have chosen for purposes of illustration may be widely varied. Any other suitable tool may, of course, be substituted for the drill 12 which I have used for illustrative purposes. The fluid feed which I have illustrated may be applied to many different kinds of machines and I do not wish to be limited to the use of such feed in connection with the specific form of machine which I have chosen for purposes of illustration. While preferably I use water as the fluid to transmit the pressures, any other fluid may be used, and for some purposes, gases, such as compressed air may be used. It will also be understood that while the connection between the piston rod 25 and the work carriage 21 could be made in many different ways, I prefer the form which I have illustrated, since by having the smooth end of the rod 25 against the smooth surface of the projection 28, any slight "out-of-alinement" motion of the rod 25 does not affect the travel of the work support 21. It will also be understood that the means for holding the work in the work support will be varied in accordance with the shape of such work. One of the particular features of my invention, however, is that the pressures for feeding the work are in substantial alinement at all times with the center of the operating tool so that there is no tendency to cramp the work carriage on its ways, or to throw the work out of alinement as it moves forward. The rods 16, 17, provide a very simple and yet efficient means for maintaining the tool and the hydraulic cylinder in correct operative relation, and at the same time provide a rigid means for resisting the reaction between the tool and the feed.

I claim:

1. In a machine of the class described, a movable support and fluid operating means therefor, comprising a cylinder, a piston therein and a rod connected to said piston and said support, means for permitting the passage of fluid to and from the rear of said piston, means for permitting the passage of fluid to and from the front of said piston and means, controlled by the motion of said support, to reverse the direction of flow of fluid into and out of the opposite ends of said cylinder.

2. In a machine of the class described, a tool spindle, a bearing therefor, a cylinder, a pair of rods, each passing through openings in projections on said bearing and said cylinder respectively, a work support movably mounted on said rods, a piston and piston rod in said cylinder with one end of said piston rod connected to said work support, means for supplying a fluid at the rear of said piston to force said work support toward said spindle and means on the ends of said pair of rods outside said projections to prevent relative longitudinal motion between said cylinder and said bearing.

3. In a machine of the class described, a movable support and fluid operating means therefor, comprising a cylinder, a piston therein and a piston rod connected to said piston and said support, an inlet pipe connecting the rear of said cylinder with a source of constant fluid pressure, a reversing pipe connecting the front of said cylinder with said source, an outlet pipe connecting with the front of said cylinder, means to regulate the rate of flow through said outlet pipe, and means operated by the motion of said support to change said inlet pipe to an outlet pipe and to open said reversing pipe to said source of pressure, whereby the direction of motion of said support may be reversed when it has reached a predetermined position in its forward travel.

4. In a machine of the class described, a movable support and fluid operating means therefor, comprising a cylinder, a piston therein and a piston rod connected to said piston and said support, an inlet pipe connecting the rear of said cylinder with a source of constant fluid pressure, a reversing pipe connecting the front of said cylinder with said source, an outlet pipe connecting with the front of said cylinder, means to regulate the rate of flow through said outlet pipe, a valve in each of said inlet and said reversing pipes and operating means for said valves constructed and arranged to set said valves so as to permit fluid to flow into said cylinder behind said piston to move said support forward, and to reverse said valves to permit fluid to flow into said cylinder in front of said piston and from the rear of said piston out of said cylinder, to move said support backward, and means, operated by the forward motion of said support, to move said operating means to reverse the positions of said valves.

5. In a machine of the class described, a movable support and fluid operating means therefor, comprising a cylinder, a piston therein and a piston rod connected to said piston and said support, an inlet pipe connecting the rear of said cylinder with a source of constant fluid pressure, an outlet pipe connecting the front of said cylinder with said source, an auxiliary outlet pipe from the front of said cylinder, means to regulate the rate of flow through said auxiliary outlet pipe, a valve in each of said inlet and said outlet pipes, means connecting said valves, constructed and arranged so that when in a first position, said inlet pipe is open to said source and said outlet pipe is closed thereto, and when in a second position, said outlet pipe is open to said source and said inlet pipe is closed thereto and open to permit fluid to flow from said cylinder, and means, operated by the forward motion of said support, to move said valves from the first position to the second position.

GEORGE DE LAVAL.

Witnesses:
JULIA V. WALLING.
M. E. REGAN.